United States Patent
Tanei et al.

(10) Patent No.: US 6,820,591 B2
(45) Date of Patent: Nov. 23, 2004

(54) CONTROL APPARATUS AND METHOD FOR INTERNAL COMBUSTION ENGINE

(75) Inventors: Katsutoshi Tanei, Aichi-gun (JP); Hirohisa Kishi, Nagoya (JP); Isao Takagi, Okazaki (JP); Rihito Kaneko, Nishikamo-gun (JP); Masashi Yoshimi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/754,555

(22) Filed: Jan. 12, 2004

(65) Prior Publication Data
US 2004/0149263 A1 Aug. 5, 2004

(30) Foreign Application Priority Data
Feb. 5, 2003 (JP) .................................... 2003-028625

(51) Int. Cl.$^7$ ................................................ F02P 5/00
(52) U.S. Cl. ................................ 123/406.21; 123/90.15
(58) Field of Search ...................... 123/406.11, 406.21, 123/406.29, 406.16, 90.1, 90.15

(56) References Cited

U.S. PATENT DOCUMENTS 4,364,345 A * 12/1982 Tsutsumi et al. ........ 123/198 F
6,425,367 B1 * 7/2002 Hiraya et al. ............... 123/299
6,748,936 B2 * 6/2004 Kinomura et al. ..... 123/568.22

FOREIGN PATENT DOCUMENTS

| JP | A 61-169641 | 7/1986 |
| JP | A 11-125126 | 5/1999 |
| JP | A 2001-234801 | 8/2001 |
| JP | A 2001-271664 | 10/2001 |

* cited by examiner

Primary Examiner—Bibhu Mohanty
(74) Attorney, Agent, or Firm—Oliff & Berridge, PLC

(57) ABSTRACT

An upper limit guard is set for a valve overlap amount according to a KCS learning value used to retard-correct an ignition timing in order to suppress knock, and an engine load. As a result, it is possible to make the upper limit guard value a value able to restrict the valve overlap amount to a value equal to, or less than, a value at which an internal EGR amount does not become excessive during a retard-correction of the ignition timing. By applying the upper limit guard to the valve overlap amount using the upper limit guard value, it is possible to suppress the valve overlap amount from increasing from the optimum value following a retard-correction of the ignition timing, as well as suppress the value of overlap amount from being reduced when it is not deviating from the optimum value and is below the upper limit guard value.

17 Claims, 3 Drawing Sheets

CONTROL APPARATUS AND METHOD FOR INTERNAL COMBUSTION ENGINE

INCORPORATION BY REFERENCE

The disclosure of Japanese Patent Application No. 2003-028625 filed on Feb. 5, 2003, including the specification, drawings and abstract is incorporated herein by reference in its entirety.

BACKGROUND OF THE INVENTION

1. Field of the Invention

The invention relates to a control apparatus and method for an internal combustion engine.

2. Description of the Related Art

An engine mounted in a vehicle such as an automobile has been known which is provided with a valve characteristic varying mechanism that varies a valve characteristic of at least one of an intake valve and an exhaust valve. In this engine, a valve overlap amount of the intake valve and the exhaust valve is adjusted by driving the valve characteristic varying mechanism based on the engine operating state, i.e., the engine speed and engine load, so that an internal EGR amount appropriate for that engine operating state is obtained. That is, by adjusting the valve overlap amount, the internal EGR amount is able to be adjusted, for example, to a value that gives priority to engine output or a value that gives priority to exhaust emissions and fuel efficiency, depending on the engine operating state.

Also, in a spark ignition engine mounted in a vehicle, the ignition timing is retard-corrected based on a correction amount which is increased or decreased depending on the presence or absence of knock. Retard-correcting the ignition timing inhibits an increase in the temperature of the combustion chamber, thereby suppressing knock. In this case, an increase in the combustion chamber temperature is able to be suppressed by retard-correcting the ignition timing because when the ignition timing is retarded, the timing at which the combustion of the mixture in the combustion chamber takes place is delayed, such that some of the mixture is expelled as exhaust into an exhaust passage while still at the high combustion temperature. As a result, the amount of heat transferred to the combustion chamber walls during combustion of the mixture is less by the amount of heat of the expelled mixture.

If the ignition timing is retard-corrected to suppress knock, however, the optimum value for the valve overlap amount (internal EGR amount) may decrease according to the amount of retard, depending on the operating state of the engine. This kind of change in the optimum value occurs, for example, when the ignition timing is retard-corrected in order to suppress knock when the engine is in an operating state where priority should be given to exhaust emissions and fuel efficiency, for example. In this operating state, the actual internal EGR amount is adjusted to the maximum value to improve exhaust emissions and fuel efficiency, but as the ignition timing is retarded this maximum value decreases. Therefore, the valve overlap amount, which is a parameter that controls the internal EGR amount, needs to be reduced so the optimum value for the valve overlap amount is reduced when there is a retard-correction of the ignition timing.

If the optimum value for the valve overlap amount were to be reduced in this way, the valve overlap amount would be higher than the optimum value. As a result, the amount of internal EGR in the engine would become excessive and adversely effect fuel efficiency and torque fluctuation. JP(A) 11-125126 proposes technology for reducing the valve overlap amount based on a correction amount used in the retard-correction of the ignition timing in order to suppress the adverse effects from this excessive amount of internal EGR. The amount of decrease in the valve overlap amount at this time is set to a value that differs for each operating range, defined according to engine speed and fuel injection quantity.

Reducing the valve overlap amount in this way makes it possible to suppress the adverse effects on fuel efficiency and torque fluctuation due to an excessive amount of internal EGR following a retard-correction of the ignition timing in order to suppress knock. However, when the ignition timing is retard-corrected only an amount corresponding to the correction amount in order to suppress knock, there may not be much change in the optimum value for the valve overlap amount depending on the operating state of the engine. If the valve overlap amount were to be reduced in this case, the amount of internal EGR would end up being reduced more than is necessary.

For example, when the engine is in an operating state where priority should be given to engine output, a value less than the value for obtaining the maximum amount of internal EGR for that engine operating state is set as the optimum value for the valve overlap amount. This is because the amount of (exhaust) gas which does not contribute to combustion, but which is in the combustion chamber during combustion, increases as the amount of internal EGR increases. So if the amount of internal EGR were to be set to the maximum value, there is a possibility that engine output would drop. Also, when the engine is in an operating state where priority should be given to engine output, in particular, when the throttle valve is close to fully open, priority is given to increasing the intake air amount as much as possible rather than to obtaining a given amount of internal EGR. Accordingly, a value with which the maximum amount of intake air can be obtained is set as the optimum value for the valve overlap amount. The optimum value for the valve overlap amount at this time is a value less than the value with which the maximum amount of internal EGR is obtained.

When the valve overlap amount is adjusted to the optimum value in this way, even if a retard-correction of the ignition timing is performed, the actual internal EGR amount is already a value less than the maximum value so the internal EGR amount will not become excessive with that retard-correction. Therefore, the valve overlap amount, which is a parameter that controls the internal EGR amount, does not need to be reduced so the optimum value for the valve overlap amount does not change following the retard-correction of the ignition timing.

In this case, if the valve overlap amount were to be reduced based on the correction amount used in the retard-correction of the ignition timing, the valve overlap amount would become much smaller than the optimum value. As a result, the amount of internal EGR would be reduced more than is necessary. In JP(A) 11-125126, the amount of decrease in the valve overlap amount at this time is set to a value that differs for each operating range. However, because the fact that the valve overlap amount is still reduced remains unchanged, the internal EGR amount would inevitably be reduced more than is necessary.

SUMMARY OF THE INVENTION

In view of the foregoing problems, this invention thus provides a control apparatus and method for an internal combustion engine, capable of suppressing an amount of internal EGR from becoming excessive, while suppressing a valve overlap amount from being reduced more than is necessary when a retard-correction of an ignition timing is performed to suppress knock.

A first aspect of the invention relates to a control apparatus for an internal combustion engine, which suppresses knock by retard-correcting an ignition timing based on a correction amount that is increased or decreased depending on the presence or absence of knock, while controlling a valve overlap amount of an intake valve and an exhaust valve to a value appropriate for the operating state of the engine. The control apparatus is provided with a guard controller which applies an upper limit guard to limit the valve overlap amount using an upper limit guard value according to the correction amount and the operating state of the engine.

Depending on the operating state of the engine, a value such as one prioritizing engine output or one prioritizing exhaust emissions and fuel efficiency is made the optimum value, and the valve overlap amount is then adjusted so as to become that optimum value. Therefore, depending on the operating state of the engine, when a retard-correction of the ignition timing of an amount corresponding to a correction amount for suppressing knock is performed, a case in which the optimum value for the valve overlap amount is greatly reduced following the retard-correction may occur, or a case in which that optimum value is not reduced much at all following the retard-correction may occur. According to this construction, the upper limit guard value used to limit the valve overlap amount is set according to the correction amount and the operating state of the engine. As a result, that upper limit guard value can be made a value able to restrict the valve overlap amount to a value equal to, or less than, a value at which the internal EGR amount will not become excessive when a retard-correction of the ignition timing is performed. If the engine operating state is such that the optimum value of the valve overlap amount is greatly reduced with a retard-correction of the ignition timing, in which case the valve overlap amount would be larger than the optimum value, the valve overlap amount would be larger than the upper limit guard value, set as described above, upon the retard-correction. One example of this kind of engine operating state is one in which exhaust emissions and fuel efficiency should be given priority. In this case, the upper limit guard is applied and uses the upper limit guard value to limit the valve overlap amount so as to suppress the internal EGR amount from becoming excessive. On the other hand, if the engine operating state is such that the optimum value of the valve overlap amount does not change much at all with a retard-correction of the ignition timing, resulting in the valve overlap amount not deviating much from the optimum value, the valve overlap amount, which has a value near the optimum value, may be less than the upper limit guard value set as described above even if the retard-correction is performed. One example of this kind of engine operating state is one in which engine output should be given priority. In this case, because the valve overlap amount is not reduced by the upper limit guard value, the valve overlap amount is not made smaller than is necessary to suppress the internal EGR amount from becoming excessive.

The guard controller may also set the upper limit guard value lower as the correction amount becomes a value that increasingly retards the ignition timing.

Accordingly, it is possible to continuously change the upper limit guard value according to the correction amount for the retard-correction of the ignition timing. Further, it is possible to smoothly change the valve overlap amount when the upper limit guard value changes as described above while the upper limit guard is applied so as to limit the valve overlap amount using the upper limit guard value.

The guard controller may also not apply the upper limit guard to limit the valve overlap amount using the upper limit guard value until the correction amount becomes a value which retard-corrects the ignition timing a predetermined amount or more.

When the retard-correction of the ignition timing to suppress knock is small, the deviance of the valve overlap amount from the optimum value due to that retard-correction of the ignition timing is also small so the deviation of the valve overlap amount from the optimum value at this time does not pose a problem. According to this construction, the upper limit guard is not applied so as to limit the valve overlap amount using the upper limit guard value in this case. Accordingly, the valve overlap amount is not needlessly reduced by the upper limit guard, which makes it possible to inhibit the internal EGR amount from being reduced more than is necessary.

The guard controller may also set a minimum value for the upper limit guard value according to the operating state of the engine.

According to this construction, because the minimum value for the upper limit guard value is set according to the engine operating state, the upper limit guard value is not reduced lower than is necessary. Therefore, it is possible to inhibit the valve overlap amount from being made smaller than is necessary when the upper limit guard is applied to limit the valve overlap amount using the upper limit guard value.

The guard controller may also not apply the upper limit guard to limit the valve overlap amount using the upper limit guard value when the engine is operating under a high load where engine output is to be given priority.

In the high load operating range of the engine where priority is given to engine output, the amount of intake air required by the internal combustion engine is large, so the valve overlap amount is adjusted so as to obtain this required amount of intake air. If the upper limit guard were applied at this time so as to limit the valve overlap amount to a small value using the upper limit guard value, the necessary intake air amount might not be able to be obtained, in which case the output performance of the engine would decease. Also, when the intake air amount of the internal combustion engine is large, as described above, the amount of internal EGR resulting from the valve overlap amount is small, so it is not necessary to restrict the valve overlap amount to a small value by the upper limit guard value in order to suppress the internal EGR amount from becoming excessive following a retard-correction of the ignition timing. According to this construction, because the upper limit guard is not applied to limit the valve overlap amount when the engine is in a high load operating state where priority is given to engine output, it is possible to inhibit the valve overlap amount from being needlessly reduced and limited to a small value, and thus inhibit the output performance of the internal combustion engine from being decreased.

Further, the guard controller may, when applying the upper limit guard to limit the valve overlap amount using the upper limit guard value, reduce the valve overlap amount by retarding the intake valve and advancing the exhaust valve, and vary a ratio of a retard amount of the intake valve to an advance amount of the exhaust valve according to the engine operating state.

According to this construction, when the valve overlap amount is restricted to a small value by the upper limit guard, the ratio of the retard amount of the intake valve and the advance amount of the exhaust valve that is necessary to realize the reduction in the valve overlap amount can be set appropriately according to the operating state of the engine. Therefore, the reduction in the valve overlap amount can be performed appropriately according to the operating state of the engine and the deterioration of fuel efficiency and torque fluctuation following that reduction can be suppressed to the minimum.

The guard controller may also vary, in accordance with the engine operating state, the rate at which the valve overlap amount is reduced when reducing the valve overlap amount with the upper limit guard value.

Accordingly, when the valve overlap amount is limited to a small value by the upper limit guard, the rate at which the valve overlap amount is reduced can be set appropriately according to the engine operating state. Therefore, the reduction of the valve overlap amount is able to be performed appropriately according to the engine operating state.

The guard controller may also set the upper limit guard value based on an engine load and the correction amount by referencing a map.

By setting the map so that the upper limit guard value when the engine is operating under a high load is a value which corresponds to a valve overlap amount that is suitable for that engine operating state, it is possible to not have the upper limit guard be applied to limit the valve overlap amount when the engine is operating under a high load. Further, by setting the map so that the upper limit guard value becomes a value which corresponds to a valve overlap amount that is suitable for that engine operating state, it is possible to not have the upper limit guard be applied to limit the valve overlap amount until the correction amount becomes a value that will retard-correcting the ignition timing a predetermined amount or more. Further, by setting the map so that the upper limit guard value becomes smaller as the correction amount becomes a value which increasingly retards the ignition timing, it is possibly to continuously change the upper limit guard value in response to that change in the correction amount. Accordingly, by setting the map so that the upper limit guard value described above is obtained according to the engine load and correction amount, it is possible to obtain an upper limit guard value that is suitable for each of the above-described conditions using only one map.

A second aspect of the invention relates to a control method for an internal combustion engine, which includes the steps of suppressing knock by retard-correcting an ignition timing based on a correction amount which is increased or decreased depending on the presence or absence of knock, controlling a valve overlap amount of an intake valve and an exhaust valve to a value suitable for an engine operating state, and applying an upper limit guard to limit the valve overlap amount using an upper limit guard value in accordance with the correction amount and the engine operating state.

BRIEF DESCRIPTION OF THE DRAWINGS

The above-mentioned embodiment and other embodiments, objects, features, advantages, technical and industrial significance of this invention will be better understood by reading the following detailed description of the preferred embodiments of the invention, when considered in connection with the accompanying drawings, in which.

DETAILED DESCRIPTION OF THE PREFERRED EMBODIMENTS

Hereinafter, one exemplary embodiment of a control apparatus for an engine to be mounted in a vehicle according to the invention will be described in more detail with reference to FIGS. 1 to 4.

Figure 1:
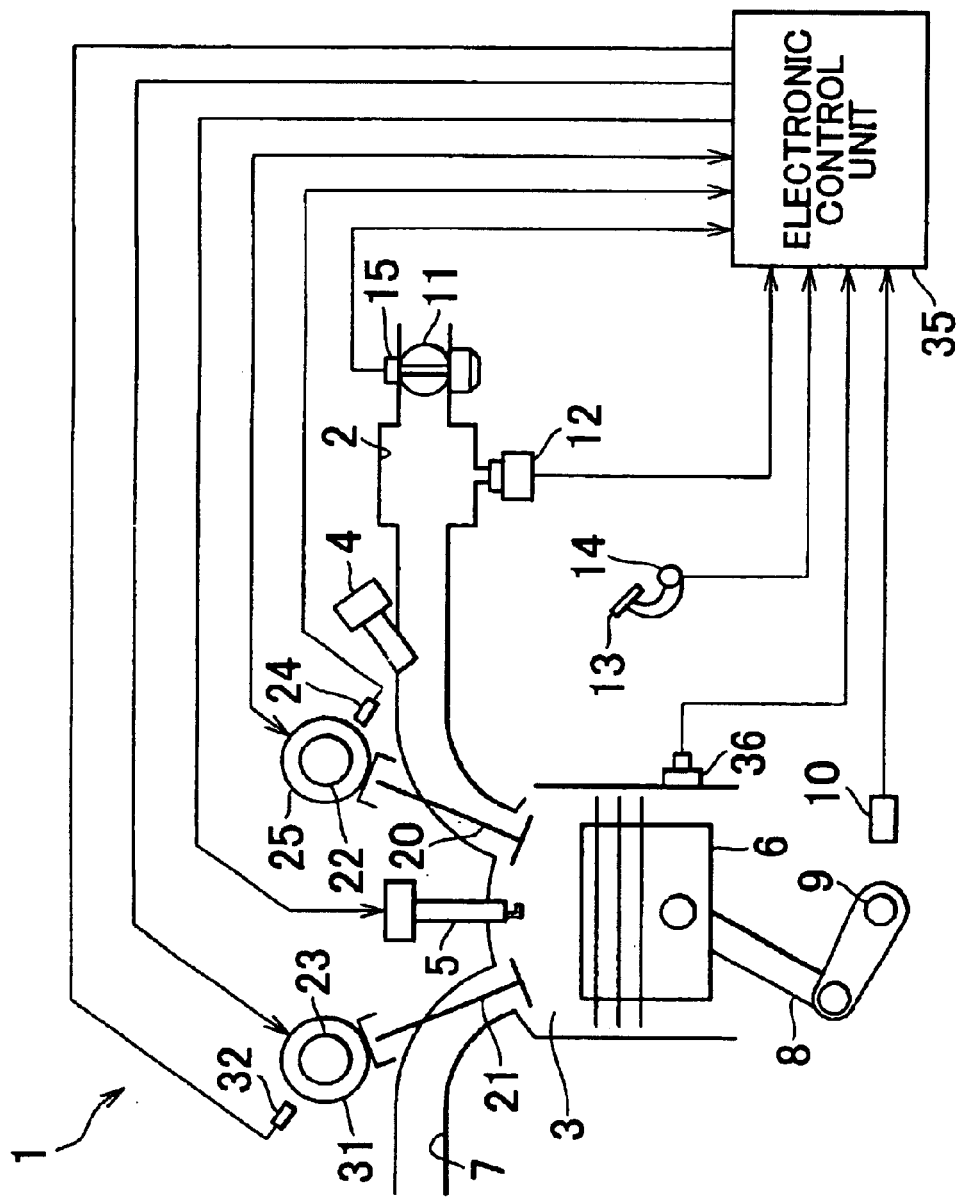
FIG. 1 is a schematic view showing an engine to which a control apparatus according to an exemplary embodiment of the invention may be applied.

In an engine 1 shown in FIG. 1, a mixture of air from an intake passage 2 and fuel injected from a fuel injection valve 4 is charged into a combustion chamber 3, where it is then ignited by a spark plug 5. Upon combustion of the mixture by ignition in the combustion chamber 3, the combustion energy generated at this time forces a piston 6 to move in a reciprocating motion. This reciprocating motion of the piston 6 is then converted by a connecting rod 8 into rotation of a crankshaft 9 which serves as an output shaft of the engine 1. Meanwhile, the mixture after combustion is expelled as exhaust from the combustion chamber 3 into an exhaust passage 7.

In the engine 1, an intake valve 20 opens/closes so as to allow/interrupt flow between the intake passage 2 and the combustion chamber 3, and an exhaust valve 21 opens/closes so as to allow/interrupt flow between the combustion chamber 3 and the exhaust passage 7. The intake valve 20 is opened and closed by an intake cam provided on an intake camshaft 22 as the camshaft 22 is rotated by the crankshaft 9 and the exhaust valve 21 is opened and closed by an exhaust cam provided on an exhaust camshaft 23 as the camshaft 23 is rotated by the crankshaft 9.

Provided on the intake camshaft 22 is an intake side valve timing varying mechanism 25 which changes the valve timing (opening/closing timing), which is a valve characteristic of the intake valve 20, by changing the relative rotation phase of the intake camshaft 22 with respect to the rotation of the crankshaft 9. Operating this intake side valve timing varying mechanism 25 so as to advance or retard the open timing of the intake valve 20 changes the opening and closing timing of the intake valve 20.

Similarly, provided on the exhaust camshaft 23 is an exhaust side valve timing varying mechanism 31 which changes the valve timing (opening/closing timing), which is a valve characteristic of the exhaust valve 21, by changing the relative rotation phase of the exhaust camshaft 23 with respect to the rotation of the crankshaft 9. Operating this exhaust side valve timing varying mechanism 31 so as to advance or retard the open timing of the exhaust valve 21 changes the opening and closing timing of the exhaust valve 21.

When the valve timings of the intake valve 20 and the exhaust valve 21 are changed, the valve overlap amount changes which changes the amount of internal EGR in the engine 1. The intake side valve timing varying mechanism 25 and the exhaust side valve timing varying mechanism 31 are controlled so that the valve overlap amount (internal EGR amount) becomes a value appropriate for the operating state of the engine. As a result, the valve overlap amount (internal EGR amount) is able to be adjusted to a value which prioritizes engine output or a value which prioritizes exhaust emissions and fuel efficiency, for example.

Next, the electrical configuration of the control apparatus for the engine 1 will be described. In the engine 1, the ignition timing of the spark plug 5 and the operation of the intake side valve timing varying mechanism 25 and the exhaust side valve timing varying mechanism 31 are controlled by an electronic control unit 35 provided in the vehicle for controlling operation of the engine 1. Various detection signals are input to the electronic control unit 35 from the following various sensors.

A crankshaft position sensor 10 which outputs a signal indicative of the rotational position of the crankshaft 9.

An intake side camshaft position sensor 24 for detecting the rotational position of the intake camshaft 22.

An exhaust side camshaft position sensor 32 for detecting the rotational position of the exhaust camshaft 23.

An accelerator pedal position sensor 14 which detects a depression amount (accelerator depression amount) of an accelerator pedal 13 operated by a driver of the vehicle.

A throttle position sensor 15 provided in the intake passage 2, which detects an opening amount of a throttle valve 11 that is opened and closed in order to change the airflow area of the intake passage 2.

A vacuum sensor 12 which detects a pressure (intake air pressure) downstream of the throttle valve 11 in the intake passage 2.

A knock sensor 36 which outputs a signal indicative of the presence/absence of knock in the engine 1.

Here, ignition timing control and valve timing control for the intake valve 20 and the exhaust valve 21, both of which are executed by the electronic control unit 35, will be described in detail separately.

[Ignition Timing Control]

The ignition timing of the engine 1 is controlled by the electronic control unit 35 based on an ignition timing command value ST. This ignition timing command value ST is calculated as shown in Expression 1 below.

$$ST = SR + F + AG \qquad (1)$$

where,

ST: ignition timing command value

SR: maximum retard ignition timing

F: Feedback correction value

AG: KCS learning value

In Expression 1, the maximum retard ignition timing SR is an ignition timing that has been retarded a predetermined amount from an ignition timing that has been advanced to the point at which knock occurs (i.e., the knock limit). This maximum retard ignition timing SR is a value that changes according to the operating state of the engine, i.e., according to the engine speed and the engine load.

The engine speed is obtained based on the detection signal output from the crankshaft position sensor 10, and the engine load is calculated from the engine speed and a parameter corresponding to the intake air amount of the engine 1. Examples of the parameter corresponding to the intake air amount include the intake air pressure obtained based on the detection signal output from the vacuum sensor 12, the throttle opening amount obtained based on the detection signal output from the throttle position sensor 15, and the accelerator depression amount obtained based on the detection signal output from the accelerator pedal position sensor 14. Here, an airflow meter may be provided instead of the vacuum sensor 12 and the intake air amount of the engine 1 may be directly detected by the airflow meter and used as the parameter.

Also in Expression 1, the feedback correction value F and the KCS learning value AG are correction values used to retard-correct the ignition timing in order to suppress knock if it occurs. These values F and AG increase or decrease according to the deterioration (presence or absence) of knock.

The feedback correction value F is changed so as to shift the ignition timing command value ST to the retard side when knock occurs, and to the advance side when knock does not occur.

On the other hand, the KCS learning value AG is changed so as to bring the feedback correction value F within a predetermined range. As the KCS learning value AG, a value may be used which is a combination of a knock correction learning value that increases or decreases so as to bring the feedback correction value F within the predetermined range over the entire load range of the engine 1, and a light load learning value that increases or decreases so as to bring the feedback correction value F into the predetermined range in the light load range of the engine 1.

If the feedback correction value F is out of the predetermined range to the side that retards the ignition timing command value ST, the KCS learning value AG is changed so as to shift the ignition timing command value ST to the retard side. Similarly, if the feedback correction value F is out of the predetermined range to the side that advances the ignition timing command value ST, the KCS learning value AG is changed so as to shift the ignition timing command value ST to the advance side. This kind of change in the KCS learning value AG occurs due to an increase or decrease in both the knock correction learning value and the light load learning value in the light load range of the engine 1, and due to an increase or decrease in just the knock correction learning value in the other engine operating ranges.

[Valve Timing Control]

The valve timing of the intake valve 20 is controlled by driving the intake side valve timing varying mechanism 25 based on the actual rotational position of the intake camshaft 22 and a target displacement angle VTTin of the valve timing of the intake valve 20. The rotational position of the intake camshaft 22 is obtained based on the detection signal output from the intake side camshaft position sensor 24 and the target displacement angle VTTin is calculated according to the operating state of the engine, i.e., the engine speed and engine load.

Similarly, the valve timing of the exhaust valve 21 is controlled by driving the exhaust side valve timing varying mechanism 31 based on the actual rotational position of the exhaust camshaft 23 and a target displacement angle VTTex of the valve timing of the exhaust valve 21. The rotational position of the exhaust camshaft 23 is obtained based on the detection signal output from the exhaust side camshaft position sensor 32 and the target displacement angle VTTex is calculated according to the actual displacement angle of the valve timing of the intake valve 20 and a required value for the valve overlap amount.

By controlling the valve timings of the intake valve 20 and exhaust valve 21 based on the target displacement angles VTTin and VTTex and the like, the respective valve timings are able to be made appropriate for the operating state of the engine. The valve timing control also controls the valve overlap amount (i.e., internal EGR amount) of the intake valve and the exhaust valve to a value (i.e., the required value) appropriate for the operating state of the engine.

The valve overlap amount (i.e., internal EGR amount) is adjusted to become an optimum value prioritizing, for example, engine output or exhaust emissions and fuel efficiency depending on the operating state of the engine. Therefore, when the ignition timing is retard-corrected in order to suppress knock, the optimum value for the valve overlap amount may greatly decrease or not change much at all, depending on the operating state of the engine. Here, the case where the optimum value greatly decreases (herein referred to as "engine operating state 1") and the case where the optimum value does not change much at all (herein referred to as "engine operating state 2") will hereinafter be described separately.

[Engine Operating State 1]

One example of this engine operating state is an engine operating state in which priority should be given to exhaust emissions and fuel efficiency. This engine operating state occurs, for example, in the light load operating range of the engine 1. In the engine operating state where exhaust emissions and fuel efficiency should be given priority, the actual internal EGR amount is adjusted to the maximum value in order to improve exhaust emissions and fuel efficiency, but this maximum value is reduced following a retard-correction of the ignition timing to suppress knock. Accordingly, it is necessary to reduce the valve overlap amount, which is a parameter that controls the internal EGR amount, so the optimum value for the valve overlap amount decreases following the retard-correction of the ignition timing. If the optimum value were to be changed in this way, the valve overlap amount would be higher than the optimum value, which would result in an excessive amount of internal EGR which would adversely effect fuel efficiency and torque fluctuation.

[Engine Operating State 2]

One example of this engine operating state is an engine operating state in which priority should be given to engine output. This engine operating state occurs, for example, in the high load operating range of the engine 1. In the engine operating state where engine output should be given priority, the optimum value of the valve overlap amount is a value that is smaller than a value for obtaining the maximum amount of internal EGR for the engine operating state at that time. This is because the amount of gas (exhaust gas) which does not contribute to combustion, but which is in the combustion chamber 3 during combustion, increases as the internal EGR amount increases, so if the internal EGR amount were set to the maximum value, there is a possibility that engine output would drop. Also, when the engine is in an operating state where engine output should be given priority, in particular, when the throttle value 11 is close to fully open, priority is given to increasing the intake air amount as much as possible rather than to obtaining a given amount of internal EGR, so a value with which the maximum amount of intake air can be obtained is set as the optimum value for the valve overlap amount. The optimum value for the valve overlap amount at this time is a value less than the value with which the maximum amount of internal EGR is obtained.

When the valve overlap amount is adjusted to the optimum value in this way, even if a retard-correction of the ignition timing is performed, the actual amount of internal EGR is already less than the maximum value so the internal EGR amount will not become excessive according to the amount of retard. Therefore, the valve overlap amount, which is a parameter that controls the internal EGR amount, does not need to be reduced, so the optimum value of the valve overlap amount will not change much following a retard-correction of the ignition timing.

As described in the section [Engine operating state 1] above, when a retard-correction of the ignition timing is performed in order to suppress knock, the valve overlap amount ends up being higher than the optimum value, which may lead to an excessive amount of internal EGR in the engine 1. In this case, it is therefore conceivable to reduce the correction amount to retard-correct the ignition timing, e.g., reduce the valve overlap amount based on the KCS learning value AG. In the case of engine operating state this approach would inhibit the internal EGR amount from becoming excessive following a retard-correction of the ignition timing and thus enable adverse effects on fuel efficiency and torque fluctuation to be suppressed. In the case of engine operating state however, this approach would result in the valve overlap amount being reduced below the optimum value, which in turn would result in the internal EGR amount being reduced more than is necessary.

Accordingly, in this exemplary embodiment, the valve overlap amount is limited by an upper limit guard value G which is set according to the KCS learning value AG and the engine load. Because this upper limit guard value G is set according to the KCS learning value AG and the engine load, it can restrict the valve overlap amount to a value equal to, or less than, a value with which the internal EGR amount does not become excessive when the ignition timing is retard-corrected.

Figure 2A:
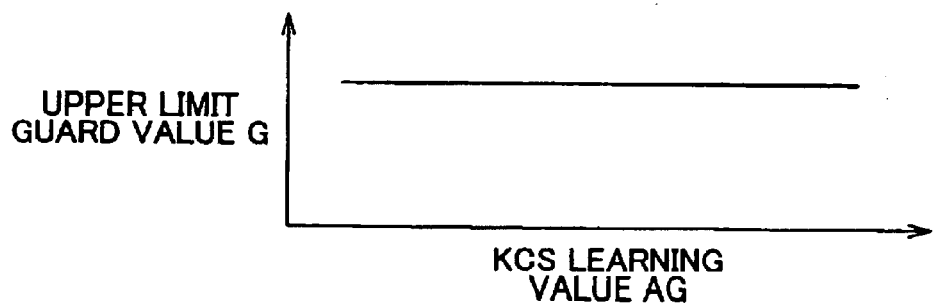
FIGS. 2A and 2B are graphs illustrating a shift in the upper limit guard value in response to a change in a KCS learning value during high load operation of the engine and light load operation of the engine.
Figure 2B:
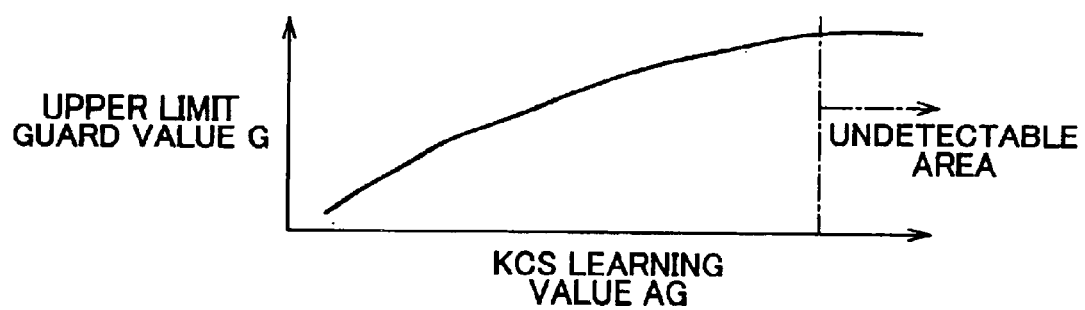

The upper limit guard value G set in this way shifts as illustrated in FIG. 2B, for example, according to the KCS learning value AG in the light load operating range of the engine 1 in which engine operating state 1 is possible. As is evident from the drawing, the upper limit guard value G for engine operating state 1 is a relatively small value depending on the KCS learning value AG. Further, the upper limit guard value G set in this way shifts as illustrated in FIG. 2A, for example, according to the KCS learning value AG in the high load operating range of the engine 1 in which engine operating state 2 is possible. As is evident from the drawing, the upper limit guard value G for engine operating state 2 is a relatively large value irrespective of the KCS learning value AG.

Therefore, in engine operating state if the KCS learning value AG were to become a predetermined value following the occurrence of knock, and the optimum value for the valve overlap amount were reduced such that the valve overlap amount ended up being greater than the optimum value, the valve overlap amount would be greater than the upper limit guard value G. In this case, even if the optimum value for the valve overlap amount were reduced following a retard-correction of the ignition timing, the upper limit guard would be applied so as to reduce the valve overlap amount using the upper limit guard value G, thus enabling an excessive amount of internal EGR in the engine 1 following the retard-correction to be suppressed.

On the other hand, in engine operating state even if the KCS learning value AG were changed following the occurrence of knock, the optimum value for the valve overlap amount would not change much so the valve overlap amount would not end up being greater than the optimum value after the optimum value had changed. In this case, the valve overlap amount may be below the upper limit guard value G set as described above depending on the KCS learning value AG. If so, the valve overlap amount would not be reduced by the upper limit guard value G. Accordingly, the valve overlap amount is not needlessly reduced to a value lower than is necessary to suppress the internal EGR amount from becoming excessive.

Figure 4:
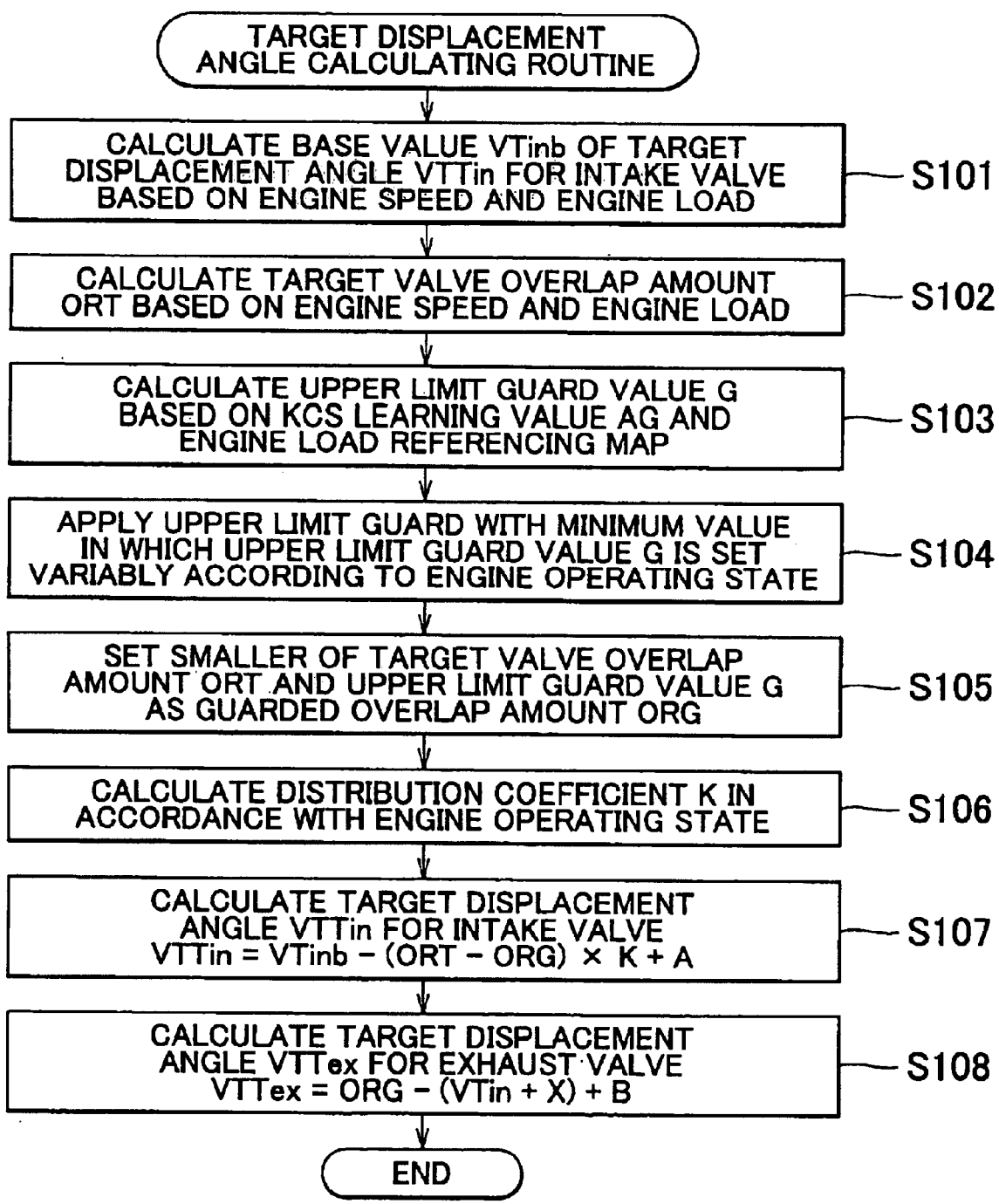
FIG. 4 is a flowchart illustrating the procedure for calculating a target displacement angle.

Next, the procedure for calculating the target displacement angles VTTin and VTTex used to control the valve overlap amount will be described with reference to the flowchart in FIG. 4 which illustrates a target displacement angle calculating routine. This target displacement angle calculating routine is executed by the electronic control unit 35 every time the crankshaft rotates a predetermined number of degrees, for example.

In the target displacement angle calculating routine, the target displacement angle VTTin for the intake valve 20 is calculated by Expression 2 below (S107).

$$VTTin = VTinb - (ORT - ORG) \times K + A \quad (2)$$

where,
  VTTin: target displacement angle for the valve timing of the intake valve
  VTinb: base value
  ORT: target value overlap amount
  ORG: guarded overlap amount
  K: distribution coefficient
  A: another correction value In Expression 2, the base value VTinb is calculated based on the engine speed and the engine load in step S101. The target valve overlap amount ORT is calculated based on the engine speed and the engine load in step S102. The target valve overlap amount ORT is the optimum value (required value) for the valve overlap amount in accordance with the operating state of the engine, i.e., the engine speed and engine load, when knock is not deteriorating. This target valve overlap amount ORT is a value prioritizing either engine output or exhaust emissions and fuel efficiency, depending on the engine operating state.

Further, the guarded overlap amount ORG in Expression 2 is a value able to be obtained by selecting the smaller of the target valve overlap amount ORT and the upper limit guard value G. This upper limit guard value G is a value that is calculated in step S103 based on the KCS learning amount AG and the engine load, referencing the map shown in FIG. 3. That value is then prevented from going below a minimum value that is set so as to vary according to the engine operating state, i.e., the engine speed and the engine load, in step S104. The smaller of the target valve overlap amount ORT and the upper limit guard value G is then set as the guarded overlap amount ORG in step S105.

If the upper limit guard value G is less than the target valve overlap amount ORT, the upper limit guard value G is made the guarded overlap amount ORG so the target displacement angle VTTin calculated in Expression 2 is a value (on the advance side) that is smaller by the amount of (ORT−ORG)×K. In this case, the valve timing of the intake valve 20 that is controlled based on the target displacement angle VTTin is advanced so the valve overlap amount becomes smaller. Accordingly, in this case the valve overlap amount is reduced by the upper limit guard value G.

If the upper limit guard value G is greater than the target valve overlap amount ORT, the target valve overlap amount ORT is made the guarded overlap amount ORG so (ORT−ORG)×K in Expression 2 is "0". In this case, the valve timing of the intake valve 20 that is controlled based on the target displacement angle VTTin is not advanced as it was above. Accordingly in this case, the upper limit guard is not applied so the valve overlap amount is not reduced by the upper limit guard value G.

In (ORT−ORG)×K, the distribution coefficient K is a value between "0" and "1" for determining what the distribution should be between the retard of the intake valve 20 and the advance of the exhaust valve 21 when the valve overlap amount is reduced. This distribution coefficient K is set to a value between "0" and "1" based on the operating state of the engine, i.e., the engine speed and engine load, in step S106. The closer the distribution coefficient K gets to "1.0" the greater the weight attributed to the valve timing advance of the intake valve 20 and the smaller the weight attributed to the valve timing retard of the exhaust valve 21 when the optimum value is reduced by the upper limit guard value G.

The target displacement angle VTTex for the exhaust valve 21 used for controlling the valve timing of the exhaust valve 21 is calculated in Expression 3 below (S108).

$$VTTex = ORG - (VTin + X) + B \quad (3)$$

where,
  VTTex: target displacement angle of the valve timing of the exhaust valve
  ORG: guarded overlap amount
  VTin: actual displacement angle of valve timing of intake valve
  X: minimum value for the valve overlap amount with this construction
  B: another correction value In Expression 3, the actual displacement angle VTin is obtained based on the detection signals output from the crankshaft position sensor 10 and the intake side camshaft position sensor 24. As is evident from the expression, the target displacement angle VTTex is a value for correcting the valve timing of the exhaust valve 21 so as to obtain the guarded overlap amount ORG for the actual displacement angle VTin of the valve timing of the intake valve 20.

Next, the map used for calculating the upper limit guard value G in step S103 will be described with reference to FIG. 3. This map, is set so that the upper limit guard value G is calculated as a value equal to the target valve overlap amount ORT in range E1 in which the KCS learning value AG is a value on a side (the side opposite the side where knock deteriorates) of a predetermined value a, which does not retard the ignition timing. When the upper limit guard value G becomes equal to the target valve overlap amount ORT in this way, the guarded overlap amount ORG becomes equal to the target valve overlap amount ORT. Therefore, until the KCS learning value AG becomes a value for retard-correcting the ignition timing a predetermined amount or more, i.e., until the KCS learning value AG becomes a value on the knock deterioration side of the predetermined value a, (ORT−ORG)×K in Expression 2 is always "0" so the upper limit guard will not be applied to the valve overlap amount.

Also, even in range E3 in which the engine load is greater than a predetermined value b, the map is set so that the upper limit guard value G is calculated as a value equal to the target valve overlap amount ORT. Accordingly, during high load operation of the engine in which the engine load is greater than the predetermined value b, (ORT−ORG)×K in Expression 2 is always "0" so the upper limit guard will not be applied to the valve overlap amount, just as in the case above.

Further, in range E2, the map is set so that the upper limit guard value G is calculated as a smaller value as the KCS learning value AG becomes a value that increasingly retards the ignition timing (a value farther on the knock deterioration side). Accordingly, in range E2, the upper limit guard value G can be changed continuously according to the KCS learning value AG.

The following effects can be obtained from the exemplary embodiment described in detail above.

(1) The valve overlap amount can be guarded by the upper limit guard value G which is set according to the KCS learning value AG and the engine load. Because this upper limit guard value G is set according to the KCS learning value AG and the engine load, it is possible to have it be a value where it can limit the valve overlap amount to a value equal to, or less than, a value at which the amount of internal EGR will not become excessive when the ignition timing is retard-corrected in order to suppress knock. By setting the upper limit guard value in this way, the valve overlap amount becomes greater than the upper limit guard value G following a retard-correction of the ignition timing in engine operating state 1. In this case, the valve overlap amount is reduced by the upper limit guard value G. Accordingly, even if the valve overlap amount were to be higher than the optimum value following a retard-correction of the ignition timing, that deviation would be suppressed, thereby enabling the amount of internal EGR to be suppressed from becoming excessive. On the other hand, in engine operating state 2, even if a retard-correction of the ignition timing were performed, the valve overlap amount may still be less than the upper limit guard value G. In this case, the valve overlap amount would not be reduced by the upper limit guard value G. Accordingly, when suppressing the internal EGR amount from becoming excessive following a retard-correction of the ignition timing, it is possible to suppress the valve overlap amount from being made smaller than is necessary by the upper limit guard.

Figure 3:
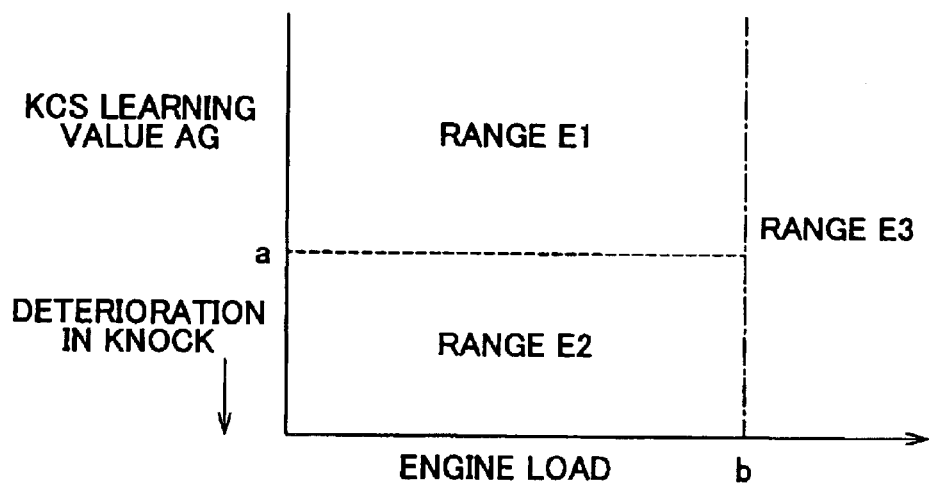
FIG. 3 is a map used for calculating the upper limit guard value.

(2) When the operating state of the engine is in range E2 in the map of FIG. 3, the upper limit guard value G is calculated as a smaller value as the KCS learning value AG becomes a value that increasingly retards the ignition timing (a value farther on the knock deterioration side). In this case, in range E2, the upper limit guard value G can be changed continuously according to the KCS learning value AG. Further, when the valve overlap amount is guarded by the upper limit guard value G, the valve overlap amount can be changed smoothly by changing the upper limit guard value G as described above.

(3) When the operating state of the engine is in range E1 in the map, i.e., when the retard-correction of the ignition timing in order to suppress knock is small, the deviation of the valve overlap amount from the optimum value due to the retard-correction of the ignition timing is small so that the deviation of the valve overlap amount from the optimum value at this time does not pose a problem. Under these conditions, the upper limit guard value G is set to a value equal to the target valve overlap amount ORT so (ORT −ORG)×K in Expression 2 is always "0". Therefore, the upper limit guard is not applied so the valve overlap amount is not needlessly reduced. As a result, it is possible to suppress the internal EGR amount from being reduced more than is necessary.

(4) Because the upper limit guard value G calculated referring to the map is guarded by a minimum value which is set so as to vary according to the operating state of the engine, the upper limit guard value G is set so as to vary according to the operating state of the engine. Accordingly, the upper limit guard value G will not become any smaller than is necessary, so it is possible to suppress the valve overlap amount from becoming smaller than is necessary when the upper limit guard is applied using the upper limit guard value G.

(5) When the operating state of the engine is in range E3 in the map, i.e., when the engine is operating under a high load, the amount of intake air required by the engine 1 is greater so the valve overlap amount is set to a relatively large value so that the required intake air amount can be obtained. If the upper limit guard were applied so as to limit the valve overlap amount at this time to a small value by the upper limit guard value G, the necessary intake air amount might not be obtained which would result in a decrease in output performance of the engine 1. Also, when the intake air amount of the engine 1 is large, the amount of internal EGR resulting from the valve overlap amount is small, so it is not necessary to suppress the internal EGR amount from becoming excessive. When the engine is operating under a high load, such as when the operating state of the engine is in range E3, the upper limit guard value G is set to a value equal to the target valve overlap amount ORT so (ORT−ORG)×K in Expression 2 is always "0". Therefore, the upper limit guard will not be applied so the valve overlap amount is not needlessly limited to a small value by the upper limit guard value G. As a result, a decrease in output performance of the engine 1 is able to be suppressed.

(6) When the upper limit guard is applied so as to limit the valve overlap amount to a small value using the upper limit guard value G, the valve overlap amount is able to be reduced by a valve timing advance of the intake valve 20 and a valve timing retard of the exhaust valve 21. The ratio of the valve timing advance amount of the intake valve 20 at this time to the valve timing retard amount of the exhaust valve 21 is made to vary according to the distribution coefficient K set in accordance with the operating state of the engine. It is therefore possible to make this ratio appropriate for the operating state of the engine, and therefore appropriately reduce the valve overlap amount according to the operating state of the engine.

(7) By using the map for calculating the upper limit guard value G, it is possible to obtain an upper limit guard value G suitable for ranges E1, E2, and E3 using only one map.

The exemplary embodiment may also be modified as follows.

An additional correction/adjustment according to the engine speed or another engine operating condition may be made to the upper limit guard value G calculated based on the retard-correction amount of the ignition timing for the engine load and knock with reference to the map.

The upper limit guard value G may be calculated using a calculation formula instead of by referencing the map.

When the valve overlap amount is reduced by the upper limit guard value G, the rate at which it is reduced may be made to vary according to the operating state of the engine, i.e., the engine speed and the engine load. In this case, it is possible to set the rate at which the valve overlap amount is reduced to an optimum value according to the operating state of the engine so that the valve overlap amount is able to be reduced appropriately in accordance with the operating state of the engine.

In the foregoing exemplary embodiment, the reduction in the valve overlap amount by the upper limit guard value G is achieved by the valve timing advance of the intake valve 20 and the valve timing retard of the exhaust valve 21. Alternatively, however, that reduction may be achieved by only one of those two.

The invention may also be applied to an engine in which only one of the intake side valve timing varying mechanism 25 and the exhaust side valve timing varying mechanism 31 is provided. In the case in which only the intake side valve timing varying mechanism 25 is provided, the valve overlap amount may be adjusted with only the valve timing control of the intake valve 20. Similarly, in the case in which only the exhaust side valve timing varying mechanism 31 is provided, the valve overlap amount may be adjusted with only the valve timing control of the exhaust valve 21.

Further, in the foregoing exemplary embodiment, when the engine operating state is in range E2 on the map, the upper limit guard value G is continuously changed according to the KCS learning value AG. Alternatively, however, the upper limit guard value G may be changed in steps according to the KCS learning value AG.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A control apparatus for an internal combustion engine, comprising:
    a suppression device which suppresses knock by retard-correcting an ignition timing based on a correction amount which is increased or decreased depending on the presence or absence of knock;
    a valve overlap controller which controls a valve overlap amount of an intake valve and an exhaust valve to a value appropriate for an engine operating state; and
    a guard controller which applies an upper limit guard to limit the valve overlap amount using an upper limit guard value in accordance with the correction amount and the engine operating state.

2. The control apparatus according to claim 1, wherein the guard controller sets the upper limit guard value smaller as the correction amount becomes a value that increasingly retards the ignition timing.

3. The control apparatus according to claim 1, wherein the guard controller does not apply the upper limit guard to limit the valve overlap amount using the upper limit guard value until the correction amount becomes a value which retard-corrects the ignition timing a predetermined amount or more.

4. The control apparatus according to claim 1, wherein the guard controller sets a minimum value for the upper limit guard value according to the engine operating state.

5. The control apparatus according to claim 1, wherein the guard controller does not apply the upper limit guard to limit the valve overlap amount using the upper limit guard value when the engine is operating under a high load where engine output is to be given priority.

6. The control apparatus according to claim 1, wherein when applying the upper limit guard to limit the valve overlap amount using the upper limit guard value, the guard controller reduces the valve overlap amount by retarding the intake valve and advancing the exhaust valve, and varies a ratio of a retard amount of the intake valve to an advance amount of the exhaust valve according to the engine operating state.

7. The control apparatus according to claim 1, wherein the guard controller varies, in accordance with the engine operating state, the rate at which the valve overlap amount is reduced when reducing the valve overlap amount with the upper limit guard value.

8. The control apparatus according to claim 1, wherein the guard controller sets the upper limit guard value based on an engine load and the correction amount by referencing a map.

9. A control method for an internal combustion engine, comprising the steps of:
    suppressing knock by retard-correcting an ignition timing based on a correction amount which is increased or decreased depending on the presence or absence of knock;
    controlling a valve overlap amount of an intake valve and an exhaust valve to a value appropriate for an engine operating state; and
    applying an upper limit guard to limit the valve overlap amount using an upper limit guard value in accordance with the correction amount and the engine operating state.

10. The control method according to claim 9, wherein the upper limit guard value is set smaller as the correction amount becomes a value that increasingly retards the ignition timing.

11. The control method according to claim 9, wherein the upper limit guard is not applied to limit the valve overlap amount using the upper limit guard value until the correction amount becomes a value which retard-corrects the ignition timing a predetermined amount or more.

12. The control method according to claim 9, wherein a minimum value for the upper limit guard value is set according to the engine operating state.

13. The control method according to claim 9, wherein the upper limit guard is not applied to limit the valve overlap amount using the upper limit guard value when the engine is operating under a high load where engine output is to be given priority.

14. The control method according to claim 9, wherein when the upper limit guard is applied to limit the valve overlap amount using the upper limit guard value, the optimum value is reduced by a retard of the intake valve and an advance of the exhaust valve, and a ratio of a retard amount of the intake valve to an advance amount of the exhaust valve is varied according to the engine operating state.

15. The control method according to claim 9, wherein the rate at which the valve overlap amount is reduced when the valve overlap amount is reduced by the upper limit guard value is varied in accordance with the engine operating state.

16. The control method according to claim 9, wherein the upper limit guard value is set based on an engine load and the correction amount by referencing a map.

17. A control apparatus for an internal combustion engine, which suppresses knock by retard-correcting an ignition timing based on a correction amount which is increased or decreased depending on the presence or absence of knock, and which controls a valve overlap amount of an intake valve and an exhaust valve to a value appropriate for an engine operating state, the control apparatus comprising:
    guarding means for applying an upper limit guard to limit the valve overlap amount using an upper limit guard value in accordance with the correction amount and the engine operating state.

* * * * *